United States Patent [19]
Fischer et al.

[11] Patent Number: 5,295,388
[45] Date of Patent: Mar. 22, 1994

[54] APPARATUS AND METHOD FOR INPACT TESTING FOR ELECTRIC GENERATOR STATOR WEDGE TIGHTNESS

[75] Inventors: Mark W. Fischer; James W. Alford, both of Pittsburgh; George F. Dailey, Plum Borough; John E. Noll, Jr., Port Vue, all of Pa.

[73] Assignee: Westinghouse Electric Corp., Pittsburgh, Pa.

[21] Appl. No.: 828,099

[22] Filed: Jan. 30, 1992

[51] Int. Cl.$^5$ .............................................. G01M 7/00
[52] U.S. Cl. .................. 73/12.09; 73/12.12; 73/865.8
[58] Field of Search ............... 73/12, 865.8, 572, 582, 73/574, 662, 12.04, 12.06, 12.12, 12.09; 33/656; 324/207.18

[56] References Cited

U.S. PATENT DOCUMENTS

| | | | |
|---|---|---|---|
| 4,803,563 | 2/1989 | Dailey et al. | 358/100 |
| 4,889,000 | 12/1989 | Jaafar et al. | 73/865.8 |
| 4,901,572 | 2/1990 | Suyama | 73/572 |
| 4,939,930 | 7/1990 | Ishizuki et al. | 73/862.626 X |
| 4,951,764 | 8/1990 | Brand | 73/862.626 X |
| 4,962,660 | 10/1990 | Dailey et al. | 73/12 |
| 5,012,684 | 5/1991 | Humphries | 33/656 |
| 5,020,234 | 6/1991 | Alkire et al. | 73/865.8 |
| 5,105,658 | 4/1992 | Jaafar et al. | 73/865.8 |

Primary Examiner—Richard E. Chilcot, Jr.
Assistant Examiner—Elizabeth L. Dougherty
Attorney, Agent, or Firm—Michael G. Panian

[57] ABSTRACT

Method and apparatus for performing remote impact testing for generator stator wedges and ripple springs. An improved low profile carriage is utilized for correlating wedge displacement data with the force required to displace the wedge. A calibrated test stand, in which exemplary wedges are placed under a known loading via a hydraulic load cell, provides means for generating calibration curve sets. From the graphed force-displacement curves generated from wedges placed under a known loading, force and displacement data generated during actual stator testing can be analyzed to measure the tightness or looseness of stator wedges, coils and ripple springs. In the preferred embodiment of the low profile carriage of the present invention, a capacitive sensor is used to directly measure the displacement or vibration of stator wedges as a result of being struck by an impact hammer with a known force.

5 Claims, 14 Drawing Sheets

FIG.10 PRIOR ART

APPARATUS AND METHOD FOR INPACT TESTING FOR ELECTRIC GENERATOR STATOR WEDGE TIGHTNESS

TECHNICAL FIELD

This invention relates to apparatus for remotely testing electric generator stator wedge tightness with the rotor in place. More particularly, it relates to such apparatus which includes a remotely controlled carriage small enough to fit into the air gap between the generator rotor and stator, and carrying an impactor to induce vibration in the wedges which is measured by an eddy current device.

BACKGROUND OF THE INVENTION

During scheduled and some forced outages of electric utility steam driven electric generators, one of the major concerns is the condition of the stator coils. Many tests are performed to quantify stator integrity. One of the most time consuming of these tests has been the test of stator wedge tightness since it has required removal of the rotor to gain access to the stator bore area, specifically the tooth tip area where the wedges are located. Removal of the rotor requires two to three days alone. The accepted industry method of testing stator wedge tightness is for a technician to "tap" the wedge, feel the resulting vibration, and listen to the sound. A loose wedge will vibrate more than a tight one, and can be felt with the fingers. In addition, a loose wedge will emit a characteristic hollow sound, which the experienced technician quickly learns to recognize as a loose wedge.

It is very important that wedge tightness be carefully ascertained and corrected if deficient because the tightness of the stator wedge is the only structural element that prevents stator coil vibration due to the combined effects of magnetic and mechanical loading. Field experience has shown that failure to hold the stator coil stationary in the stator slot permits ever increasing levels of vibration leading to deterioration and finally failure of the stator mica insulation and, in many instances, grounding or "flashover" of the coils. When this occurs, the owner-operator of the unit is faced with a time-consuming and expensive rewinding process. For these reasons, stator wedge tightness is of interest during routine outages, and not just when the rotor is removed.

One of the difficulties in testing wedge tightness without removal of the rotor is that there is as little as 3.81 cm (1 5 in.) of clearance between the stator bore and the retainer ring through which apparatus may be inserted to inspect the wedges distributed along the length of the stator. Another difficulty is that the wedges are made of non-conductive, non-magnetically permeable material such as, for example, fiberglass coated with Kevlar which is, compared to other materials such as steel, an absorbent of mechanical energy so that the techniques available for measuring tightness are limited. An additional difficulty, especially in the case of an impact tester, is that the stator coils extend radially outward about a horizontal axis such that the effect of gravity on the impactor varies with the angular position of the stator wedge being tested.

Commonly owned U.S. Pat. No. 4,889,000 discloses a low profile remotely controlled carriage for insertion into the gap between the rotor and stator of an electric generator for performing inspections. The carriage is positioned over a wedge with the aid of a miniaturized television camera. A solenoid when energized strikes the wedge and a microphone records the acoustic response. It has been found, however, that it is desirable to apply a larger and more repeatable impact force to the wedge than can be developed by a solenoid. It has also been found that it is difficult to assess with a computer the acoustic response recorded by the microphone.

The inspection apparatus of U.S. Pat. No. 4,889,000 also includes an Electro-magnetic Core Imperfection Detector (EL-CID) tester which is used to assess the condition of the insulation between stator laminations. Commonly owned U.S. Pat. No. 4,803,563 also discloses an EL-CID tester mounted on a carriage inserted between the rotor and stator of an electric generator for inspecting the insulation between the stator laminations. The carriage in U.S. Pat. No. 4,803,563 is held in place against the stator by permanent magnets embedded in the carriage chassis.

Other attempts have been made to quantify the "tap, listen and feel" process for testing stator wedge tightness. A mechanical impedance probe has been developed which is based upon the recognition that during a resonance sweep, a tight wedge will resonate (shift phase) at a slightly higher frequency than a loose one. This method does not discriminate between difference degrees of looseness nor does the apparatus have sufficient power to resonate wedges of the size and style used with the larger steam driven units. In addition, the unit is too large to fit into the rotor stator air gap.

Another type of apparatus for measuring wedge tightness uses a force measurement system. The theory of operation is that when an impact force is applied to a stator wedge, the hammer will maintain contact with a loose wedge for a longer interval before recoiling than with the same wedge in a tight condition. This has been confirmed, however, the sensitivity of the test does not permit clear discrimination between the tight and loose conditions. Furthermore, a version of such a device small enough for use in the air gap of the generator has not been developed.

Commonly owned U.S. Pat. No. 4,962,660 which issued on Oct. 16, 1990 provides an apparatus which can determine wedge tightness without removal of the rotor. What is needed is an improved system which can provide a direct measurement of wedge displacement in conjunction with the force required to cause that displacement.

BRIEF DESCRIPTION OF THE DRAWINGS

A full understanding of the invention can be gained from the following description when read in conjunction with the accompanying drawings in which:

FIG. 10 is a vertical section in enlarged scale through part of the carriage shown in FIG. 9 taken along the line X—X.

DESCRIPTION OF THE PREFERRED EMBODIMENTS

Figure 1:
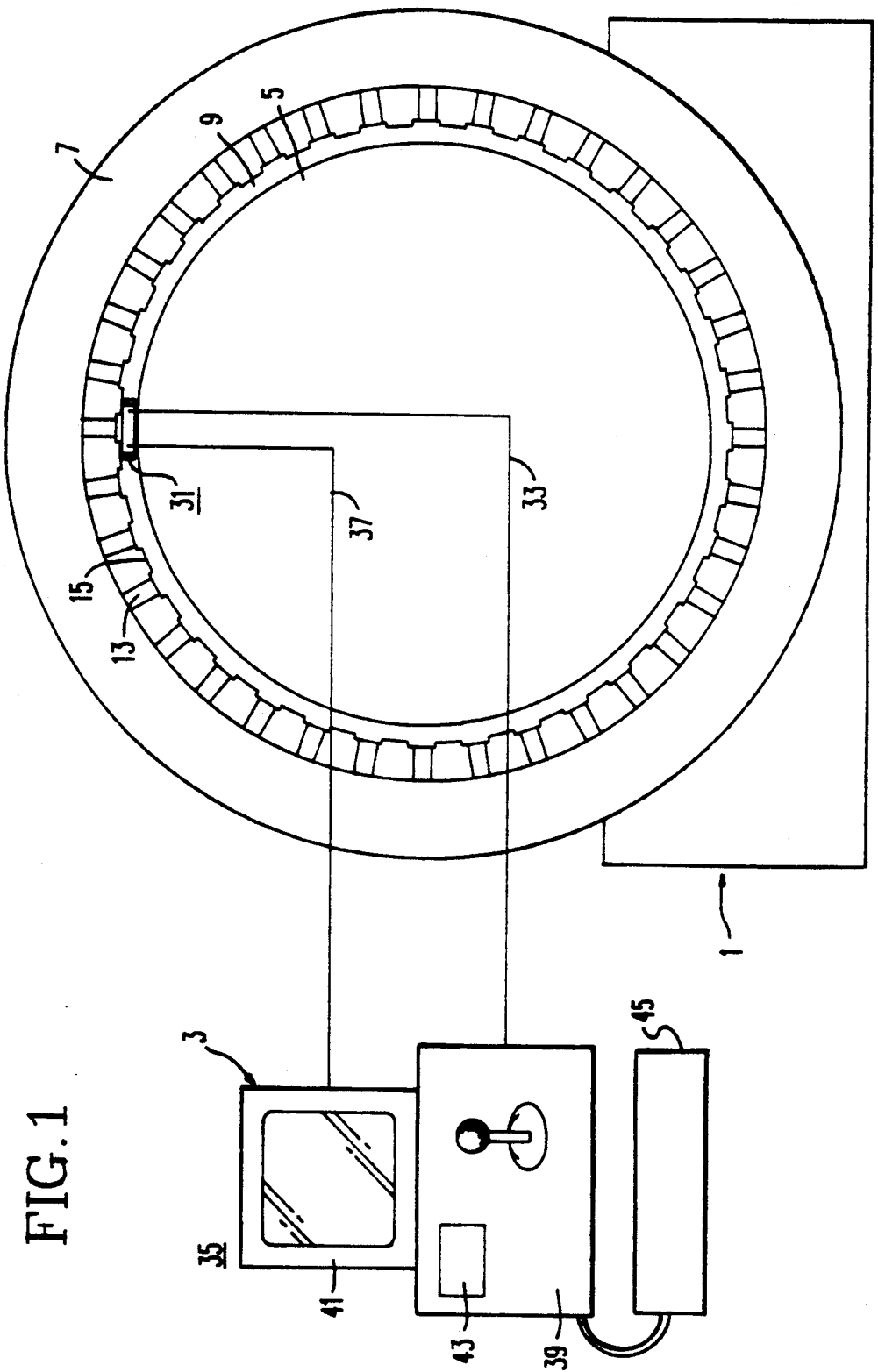
FIG. 1 is a schematic view of an electric generator with a prior art inspection system in place to perform an inspection of generator stator wedge tightness.

FIG. 1 illustrates schematically a large steam turbine driven electric power generator with the inspection system 3 of the invention in place for measuring generator stator wedge tightness. The generator 1 includes a rotor 5 mounted for rotation within a stator 7. A narrow gap 9 is formed between the rotor retainer ring 11 and the stator. In some electric generators, this gap 9 can be as narrow as one and a half inches. The stator 7 includes stator coils 13 positioned between longitudinally extending stator teeth 15

Figure 2:
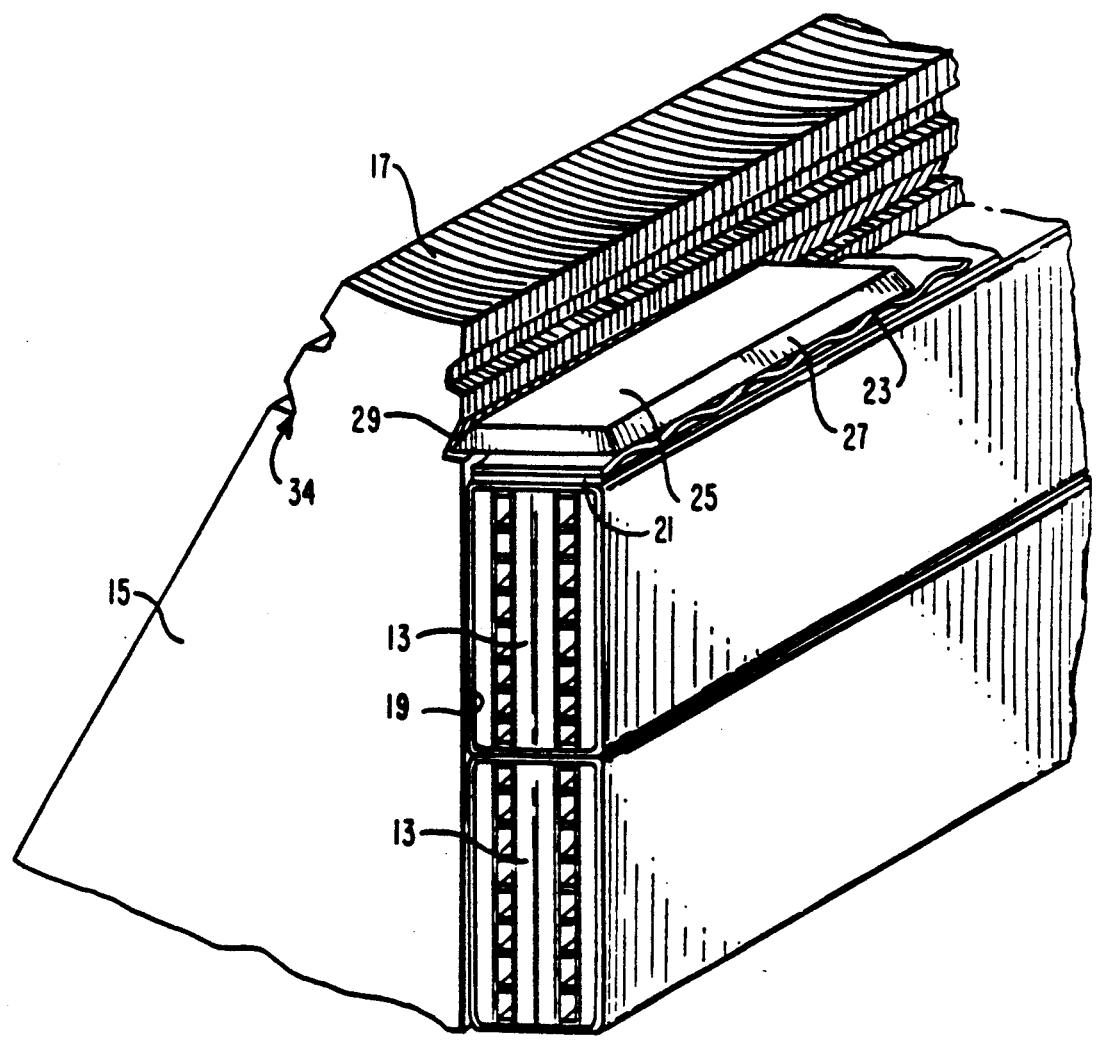
FIG. 2 is a fragmentary isometric view of a portion of the stator of the electric generator of FIG. 1 illustrating the manner in which the stator coil is held in place.

As shown more clearly in FIG. 2, the stator teeth 15 which are made of laminations 17 form stator slots 19 in which stator coils 13 are stacked in pairs, one on top of the other. The stator coils 13 are retained in the slots 19 by shims 21, sections of ripple springs 23, and stator wedges 25 having beveled edges 27 which engage correspondingly shaped grooves 29 in the sidewalls of the stator teeth 15. Although ripple springs 23 are shown in the Figure, some stator designs do not include these. The ripple spring sections 23 are compressed between the stator wedges and shims 21 to generate a force which firmly holds the coils in place. Over time, the ripple springs can lose their resiliency so that the wedges become loose. As previously mentioned, this permits the coils 13 to vibrate which can result in damage to the coil and eventual failure of the coil insulation. The present invention inspects stator wedge tightness so that corrective action can be taken before this occurs.

Returning to FIG. 1, the inspection system 3 includes a low profile main carriage 31 which is inserted in the narrow gap 9 between the rotor and stator and travels along the stator slot inspecting the wedges for tightness. As will be seen, the low profile main carriage 31 carries an impactor which sets up vibrations in the stator wedges and a detector which generates electric signals in response to those vibrations. The low profile carriage 31 also carries a miniature television camera which the operator can use to successively position the low profile main carriage over successive stator wedges in the slot and by which he can monitor operation of the impactor. Electrical signals to and from the low profile main carriage to control positioning of the carriage and operation of the impactor and the detector, and data signals from the detector are carried by an electrical cable 33 connected between the low profile main carriage 31 and a console 35. Similarly, control and video signals to and from the video camera are carried between the main carriage and the console by cable 37. The cable 33 is connected to an electronic control box 39 while the cable 37 carrying the video signals is connected to a monitor 41. The electronic control box 39 includes a display 43 and a keyboard 45 through which the operator can interface with and control the inspection system. The monitor 41, permits the operator to position the main carriage 31 over a selected stator wedge and to observe operation of the impactor.

Figure 3:
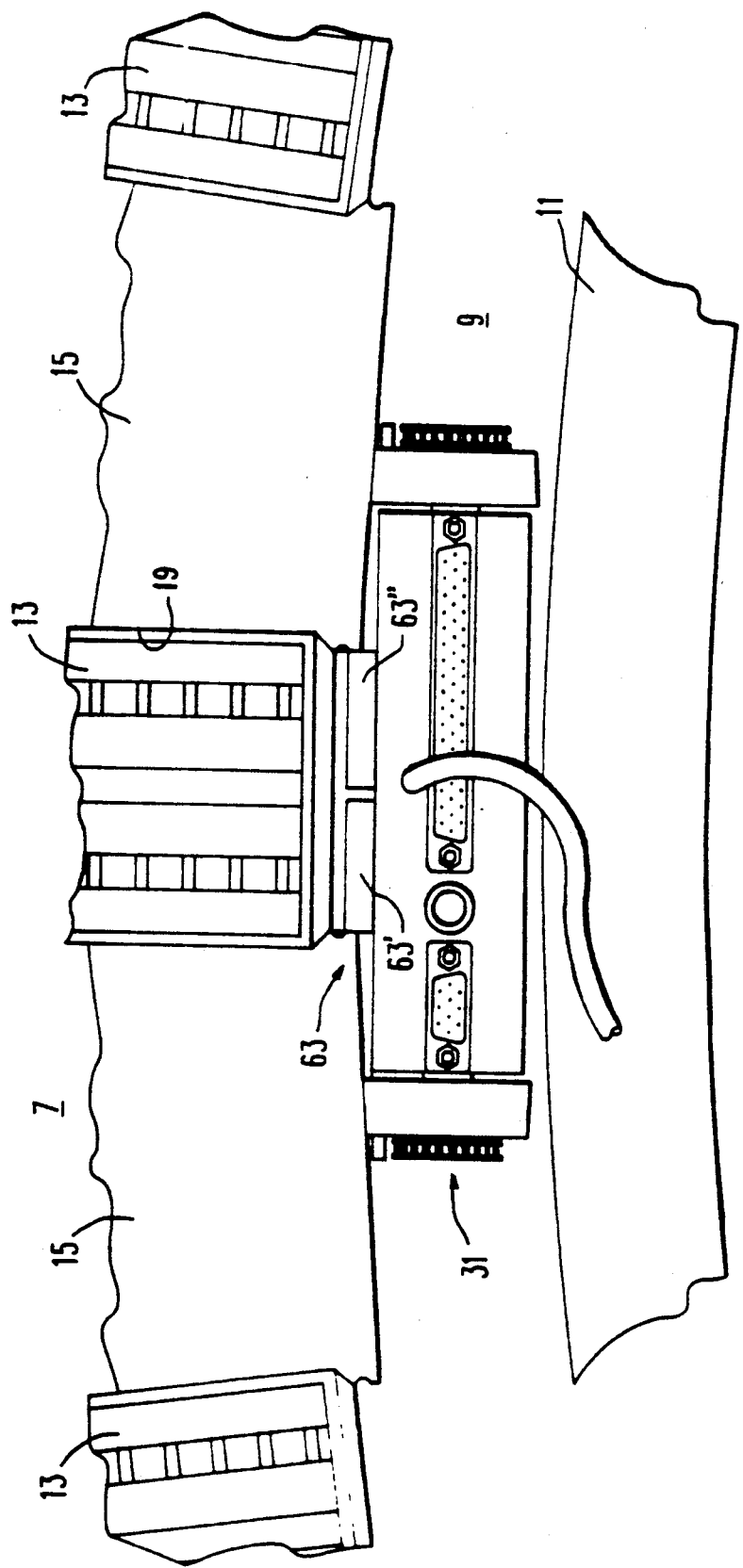
FIG. 3 is rear view of the low profile main carriage of the prior art inspection system shown in place within the electric generator of FIG. 1.
Figure 4:
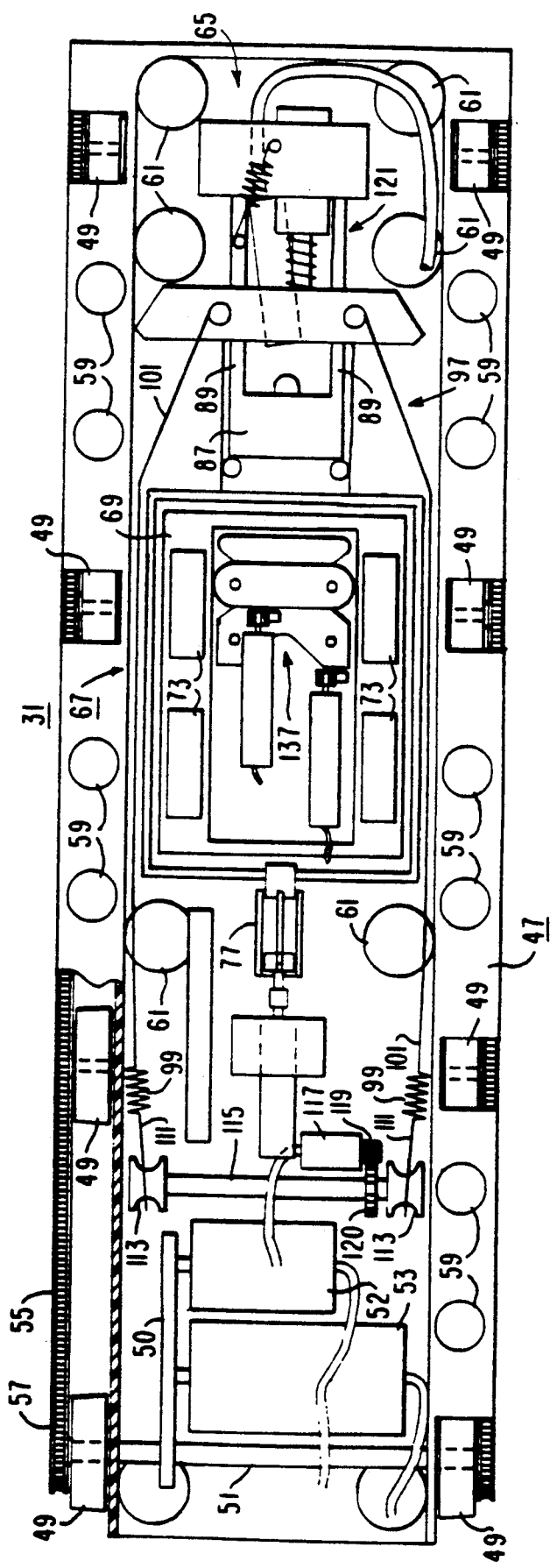
FIG. 4 is a top plan view of the low profile main carriage of the prior art inspection system with the top cover removed.
Figure 5:
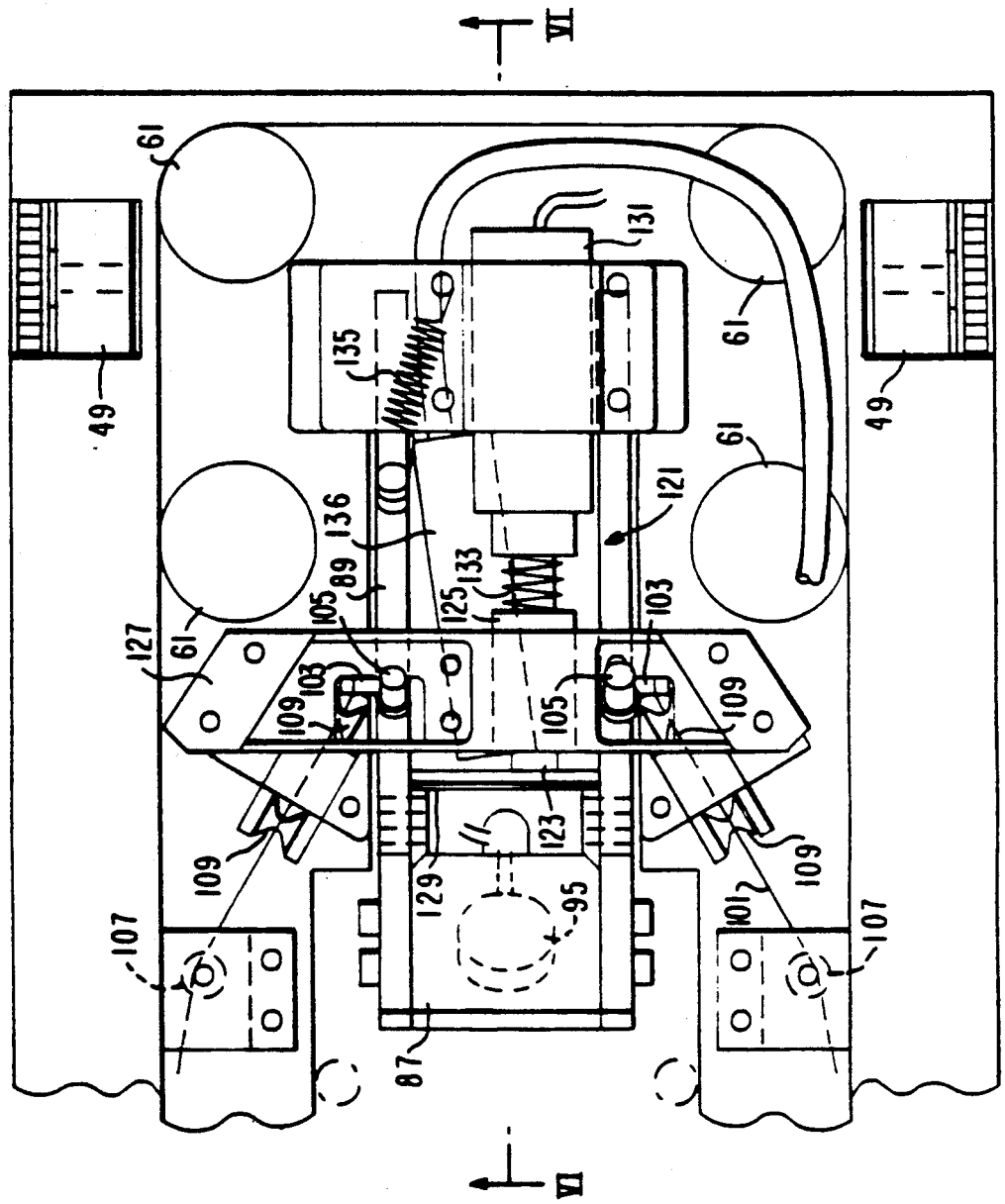
FIG. 5 is a view of a portion of FIG. 4 shown at an enlarged scale.

Referring especially to FIGS. 3 through 10, which is generally the subject of commonly owned U.S. Pat. No. 4,962,660, the low profile main carriage 31 has a chassis 47 made of a non-electrically conductive, non-magnetically permeable material such as fiberglass. Rotatably mounted along each side of the chassis 47 are four wheels 49. The rear wheels 49 are mounted on a shaft 51 which is driven through a timing belt 50 by an electric motor 53 mounted on the chassis 47. Chains 55 engage sprockets 57 to drive all of the drive wheels 49 with the motor 53. An encoder 52 also driven by timing belt 50 provides signals representing carriage movement to the electronic control box 39 for determining the position of the carriage. A number of one half inch diameter and one inch diameter neodymium magnets 59 and 61 respectively are distributed over the chassis 47. These magnets secure the main carriage to the stator for all locations of the stator slots around the interior of the stator. Guides 63 mounted on the bottom of the chassis 47 engage the stator slot 19 as seen in FIG. 3 to direct the main carriage along a selected slot. Parts 63' of the guides 63 are movable laterally with respect to a fixed part 63" to adjust the width of the guide to accommodate for variations in the width of the stator slots in different machines. As described to this point, the main carriage 31 is similar to that described in U.S. Pat. No. 4,803,563.

The main carriage 31 carries an impactor 65 and a vibration detector 67. The vibration detector 67 is mounted on a seismically isolated detector carriage 69 disposed in an aperture 71 in the chassis 47 of the main carriage 31. This detector carriage 69 is supported by four free-turning wheels 73 and has its own set of neodymium magnets 75 to secure it to the stator in all orientations. The detector carriage 69 is selectively coupled with the main carriage by a gripper 77 mounted on the chassis 47 by mounting 79. The gripper 77 has a pair of jaws 81 which are opened and closed by a motor 82 having a threaded shaft 83 journalled in support 88 and engaging a traveling nut 84 carrying a pair of actuating arms 85 pinned to the jaws 81. Gripper 77 positions the detector carriage 69 within the aperture 71 by gripping a rod 80 so that the detector carriage 69 is seismically isolated from the remainder of the main carriage by the gap 86 when the jaws 81 are opened. This seismic isolation of the detector assures that the deflection measurements made by the detector are not magnified by the direct transmission of movement of the impactor through the main carriage.

The impactor 65 includes an impactor head 87 pivotally mounted by a pair of support arms 89 for movement along an arcuate path 91. A hemispherical nose 93 on the impactor head concentrates the force generated by the impactor which is measured by a force cell 95.

The impactor 65 must generate enough force to compress the ripple spring 23 to some degree beneath the stator wedge 25. The tighter the wedge, the greater the force required to achieve this. It has been determined that energy in excess of one foot pound which generates a force at the point of impact of at least two hundred pounds is required for reliable wedge tightness measurement. While the impactor head 87 has a sizeable mass, the length of the stroke over which it can be accelerated is restricted by the width of the air gap between the stator and the rotor. Furthermore, gravity cannot be relied upon to accelerate the impactor head since the impactor must be able to operate in all orientations including upside down. A mechanism 97 is included for applying a selected driving force to the impactor head.

The driving force mechanism 97 includes a pair of helical tension springs 99 connected to the pivot arm 89 through cables 101 secured to pins 103 extending laterally from uprights 105 mounted on the pivot arms. The cables 101 are reeved around the detector carriage by pulleys 107 and directed upward to pins 103 by pulleys 109. It will be noted that the axes of the springs 99 lie in the plane of the main carriage 31 so that they may be extended the required length to generate the appropriate driving force for the impactor within the limited space available between the rotor and stator. Connected to the other end of each of the springs 99 is a cable 111 which is wound on a windless pulley 113. The windless pulleys 113 are mounted on a common shaft 115 driven by a motor 117 through pinion gear 119 and gear 120.

Figure 6:
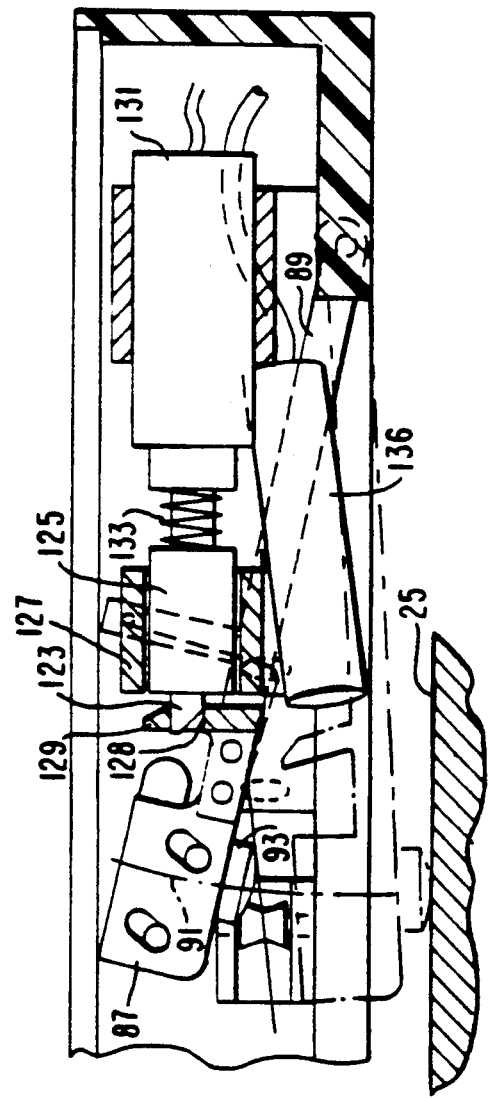
FIG. 6 is a vertical section through the portion of the low profile carriage shown in FIG. 5 taken along the line VI—VI.
Figure 7:
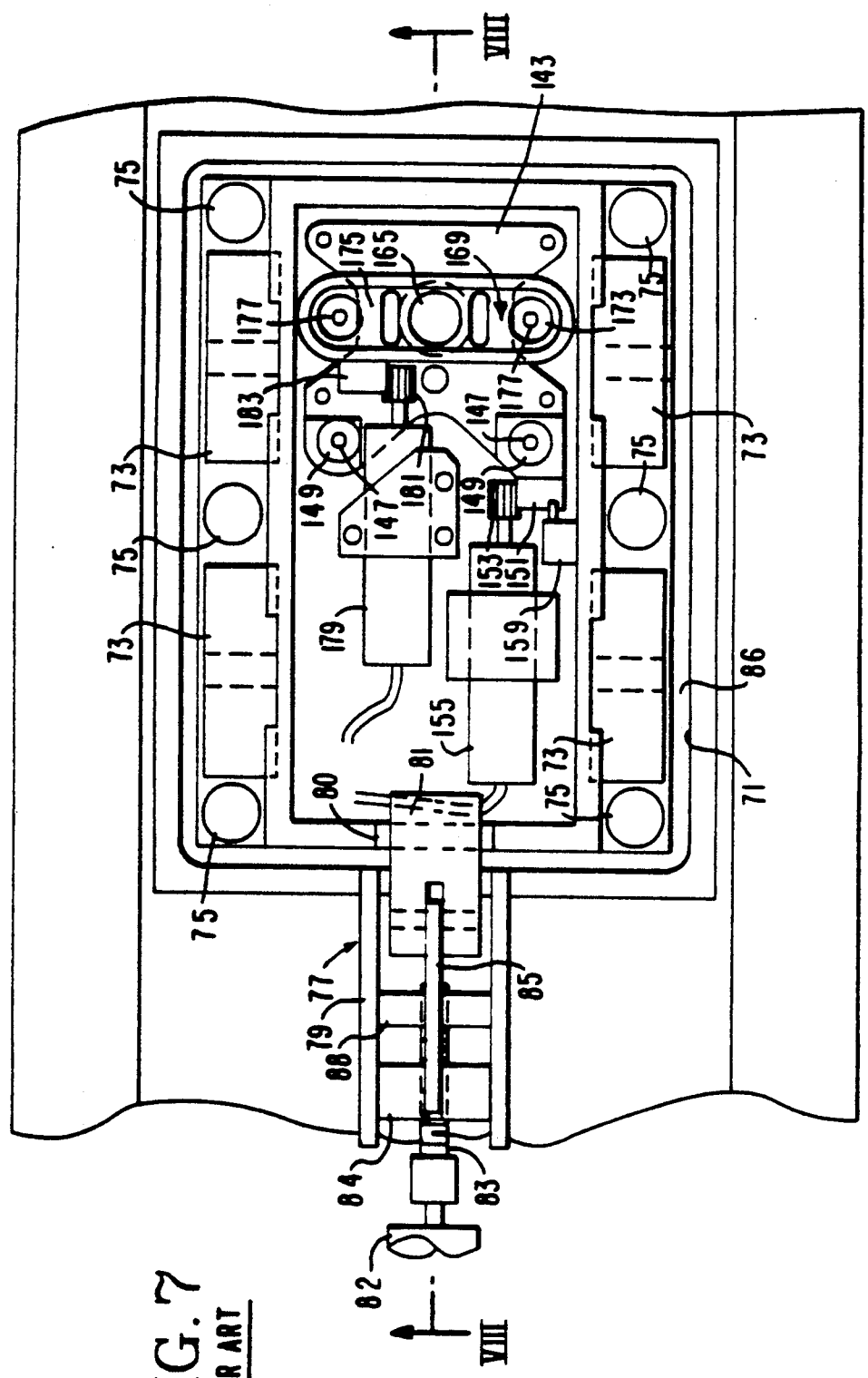
FIG. 7 is plan view of the detector and gripper portions of the low profile carriage.
Figure 8:
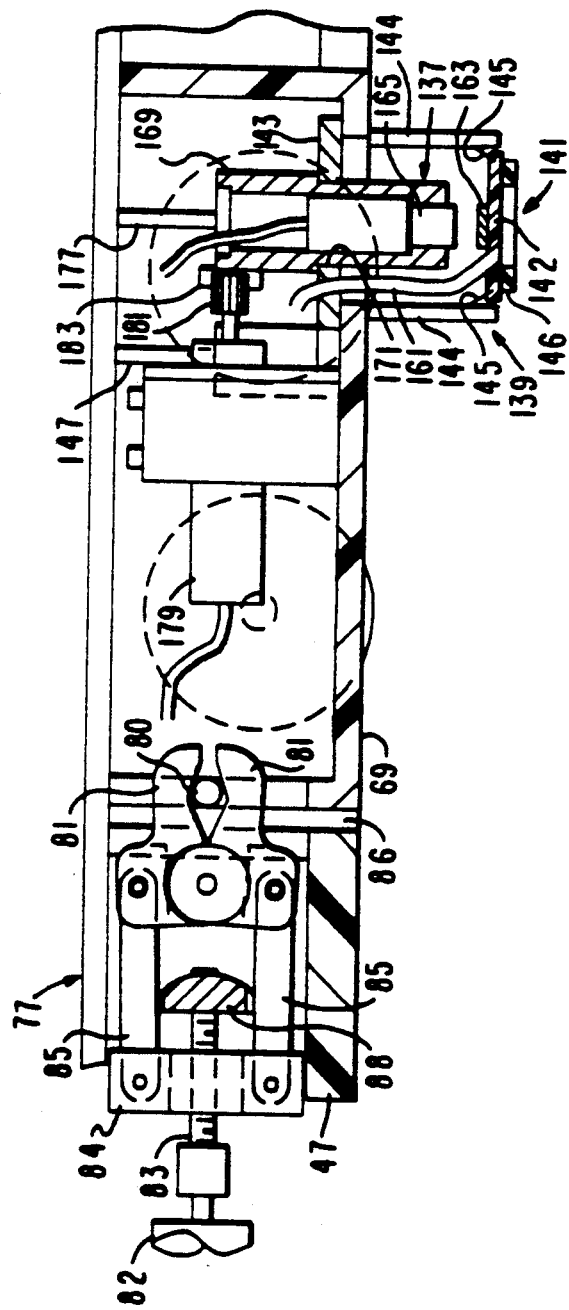
FIG. 8 is a vertical section of the detector and gripper taken along the line VIII—VIII in FIG. 7.

A latch mechanism 121 which retains the impact head in a cocked position shown in full line in FIG. 6 includes a latch pin 123 which slides in a Teflon resin bearing 125 supported by a support bracket 127 straddling the pivot arms 89. The latch pin 123 engages a notch 128 in a cross bar 129 spanning the pivot arms 89. The latch pin 123 is retracted by a dc motor 131. A spring 133 biases the latch pin 123 to the latched position. By control of the motor 117, appropriate tension can be applied to the springs 99 so that the impactor 65 generates a constant impact force for all orientations of the main carriage 31. A return spring 135 returns the impactor head 87 to the cocked position when tension on the springs 99 is relieved.

A miniature television camera 136 is mounted on the low profile carriage to provide the operator with a view of the impactor and detector for positioning the carriage and observing the test.

The vibration detector 67 mounted on the detector carriage 69 includes an eddy current detector 137. Since the stator wedges are electrically non-conducting, a wedge follower 139 which is at least in part electrically conducting is also provided. In the embodiment shown in FIGS. 7 and 8, the wedge follower is a vacuum cup 141. The vacuum cap 141 is suspended from a roughly X shaped mounting plate 143 with four depending support rods 144 by helical extension springs 145. The mounting plate 143 has a pair of upstanding shafts 147 which slide in linear bearings 149 mounted on the detector carriage 69. A rack 151 projecting from the mounting plate 143 is engaged by a pinion gear 153 on the shaft of a motor 155. Operation of the motor 155 raises and lowers the mounting plate 143 to selectively bring the vacuum cup 141 into contact with the adjacent stator wedge. In the extended position, a limit switch 159 turns on a vacuum pump (not shown) which evacuates the vacuum cup 141 through a vacuum hose 161 to securely attach the vacuum cup 141 to the adjacent stator wedge so that the vacuum cup 141 accurately follows deflection of the stator wedge resulting from the vibrations set up by the impactor 65. The vacuum cup 141 is a nylon disc 142 with a rubber ring 146 secured to its lower surface. To provide the electrically conductive material required for operation of the eddy current detector, a piece of copper foil 163 is attached to the vacuum cup 141.

The eddy current detector 137 comprises an eddy current coil 165 mounted in the base 167 of a generally T shaped sensor holder 169 which extends through a hole 171 in the mounting plate 143. Linear bearings 173 in the arms 175 of the T shaped sensor holder 169 ride on a pair of shafts 177 mounted on the detector carriage 69 so that the eddy current coil 165 can be raised and lowered to a fixed distance from the vacuum cup 141 by a motor 179 having a pinion gear 181 which engages a rack 183 secured to the sensor holder 169.

In operation, the low profile main carriage 31 in inserted through the gap 9 between the rotor 5 and stator 7 of the electric generator 1 with the guides 63 engaging the mouth of a selected stator slot 19. The magnets 59 and 61 hold the carriage 31 in place against the stator regardless of the position of the selected stator slot 19 around the stator. The drive motor 53 is then energized to drive the low profile main carriage 31 along the slot to position the carriage, as observed on the monitor 41, so that the impactor nose 87 will strike the so-call "sweet spot" or wedge centroid of a selected wedge while the vacuum cup 141 is positioned to monitor the vibration at the end of the wedge. Positioning the impactor in this manner produces maximum wedge vibration for a given impact.

With the impactor positioned at the desired spot over the selected wedge, the motor 83 is operated to open the clamp 77 and isolate the detector carriage 69 from the main carriage 31. The magnets 75 hold the detector carriage 69 in position against the stator. The motor 155 is then operated to extend the vacuum cup 141 into contact with the selected wedge and operation of limit switch 159 turns on the vacuum pump to apply a vacuum through vacuum line 161 to firmly secure the vacuum cup 141 to the selected wedge. Motor 179 is then operated in a fast mode to extend the eddy current coil 165 toward the piece of copper foil 163 secured to the vacuum cup 141. At a predetermined distance from the vacuum cup 141, the motor 179 is slowed down and the eddy current voltage is closely monitored for rapid decrease to zero which occurs at the pre-calibrated balance point, selected in the exemplary system to be 0.025 inches from the foil on the vacuum cup. At this point, the vacuum cup 141 and the eddy current coil 165 are correctly positioned and ready for measurement of a wedge impact.

In preparation for an impact, the impactor head is held in the cocked position by the latch pin 123. The motor 117 is operated to turn the windless pulleys 113 to preload the tension springs 99 and thereby apply a driving force to the impactor head through cables 101. The motor 117 has an integral encoder which enables the control system to rotate the shaft of motor 117, and hence the windless pulleys 113, the correct number of turns. For example, when the impactor is operating "upside down" in the generator 12 o'clock position, the impactor is working against gravity and slightly more spring tension is required than in the 6 o'clock position. Adjusting spring tension for unit orientation assures consistent impact forces independent of unit orientation.

The wedge tightness test is performed by energizing the motor 131 to withdraw latch pin 123 from the cross bar 129 permitting the preloaded springs 99 to apply a driving force to the impactor head 87 causing the impactor head nose 93 to strike the stator wedge with the prescribed force. The resulting vibrations set up in the wedge are followed by the vacuum cup 141. The eddy current coil 165 generates a signal which is a function of the instantaneous spacing between the coil and the suction cup and therefore representative of wedge deflection. This arrangement measures wedge deflection with an accuracy which provides the capability of reliably distinguishing between the large amplitude vibrations of a loose wedge and the small amplitude vibrations of a tight wedge. The impactor is recocked for the next impact by return spring 135 when tension on the springs 99 is relieved.

Figure 9:
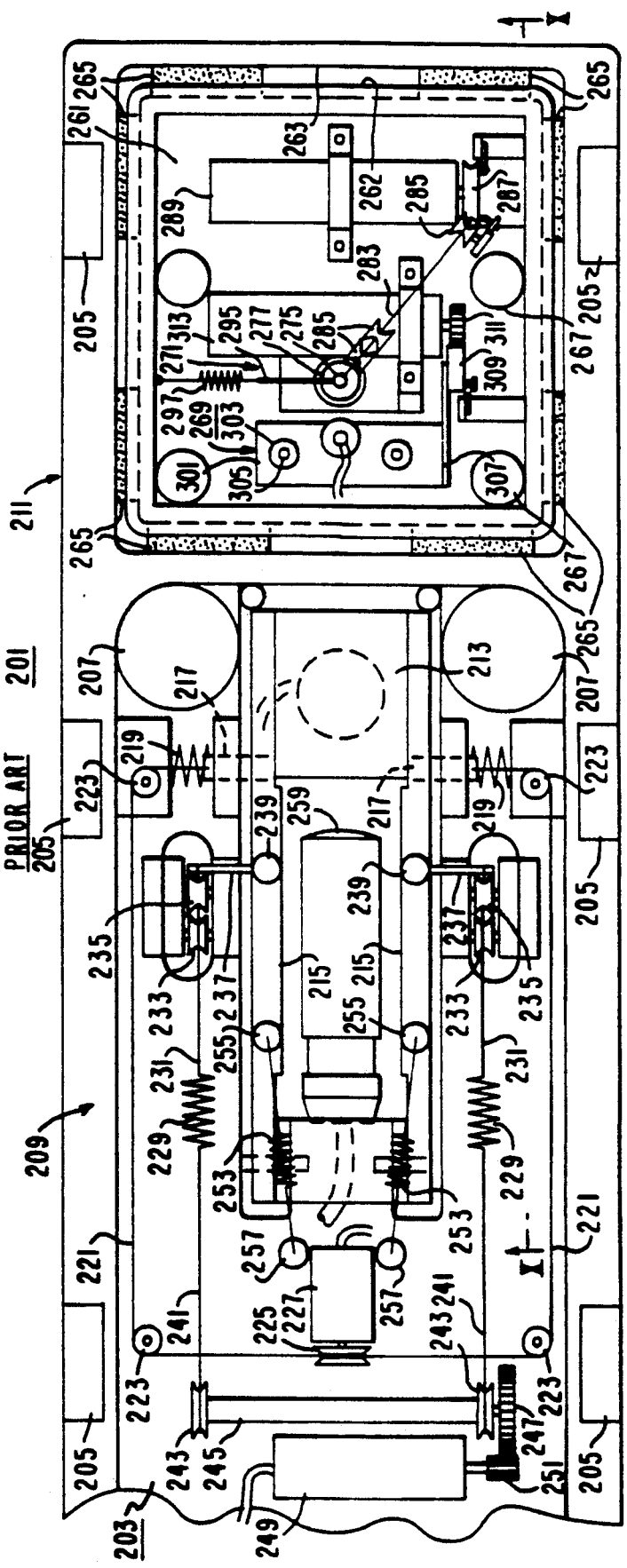
FIG. 9 is a top plan view of another embodiment of a prior art low profile carriage.
Figure 10:
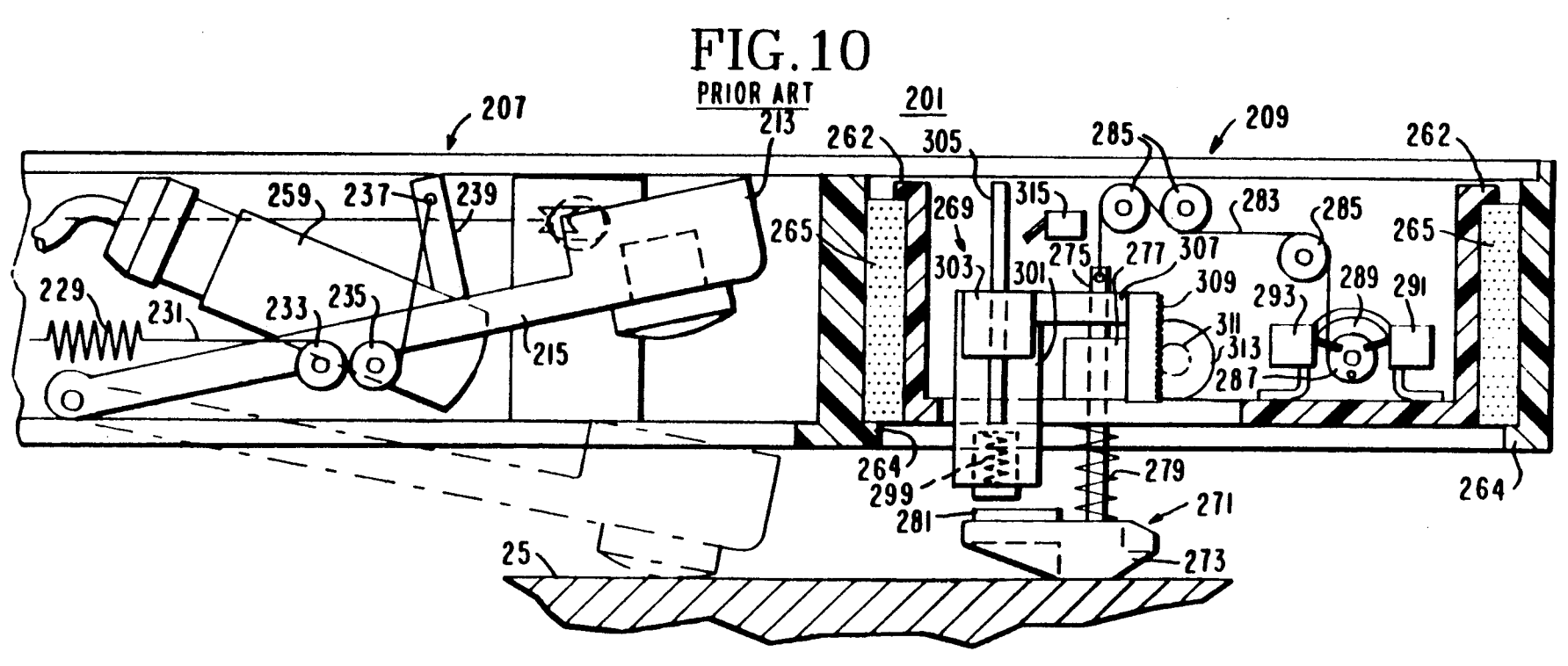

FIGS. 9 and 10 illustrate an alternate embodiment of a low profile carriage. The modified carriage 201 has a chassis 203 which is constructed and driven by wheels 205, and is held in place against the stator by neodymium magnets 207, similarly to the carriage 31 previously described. Like the carriage 31, the modified carriage 201 mounts an impactor 209 and a detector 211. However, in this modified arrangement, the detector 211 is located at the end of the carriage 201 with the impactor 209 inboard. This permits the carriage to more easily test the last wedge in each stator slot.

Both the impactor 209 and detector 211 are modified from the corresponding mechanisms on the carriage 31. The impactor head 213 pivotally mounted by its support arms 215 is held in the cocked position by a pair of confronting latch pins 217 which are biased to the latched positioned by compression springs 219 The latch pins 217 are retracted by a pair of cables 221 which are reeved around pulleys 223 and wrapped in opposite directions around the windless pulley 225 on motor 227 mounted on the chassis 203. Preloading is applied to the impactor head in the cocked position by a pair of tension springs 229 connected to the impactor head 213 through cables 231 reeved over pulleys 233 and under pulleys 235 and connected to pins 237 extending laterally from posts 239 on the support arms 215. The other ends of the springs 229 are connected to cables 241 which are wound on windless pulleys 243. The windless pulleys 243 are mounted on a common shaft 245 having a gear 247 driven by a motor 249 through pinion 251. The impactor head 213 is biased to the cocked position by return springs 253 stretched between posts 255 on the support arms 215 and posts 257 mounted on the chassis. A miniature television camera 259 positioned between the support arms 215 of the impactor allows the operator to position the carriage 201 for testing of a selected stator wedge and to observe operation of the impactor and the detector.

The modified detector 211 includes a separate detector carriage 261 mounted in an aperture 263 in the chassis 203, but seismically isolated from the chassis 203 and supported by eight foam pads 265. The foam pads may be made for instance from low density closed cell urethane foam. Flanges 262 around the top of the detector carriage and 264 around the bottom of aperture 263 provide an interference fit with said foam pads to retain the detector carriage in said aperture. Separate neodymium magnets 267 secure the detector carriage 261 to the bore of the stator.

The carriage 261 carries an eddy current detector 269 and a wedge follower 271. The wedge follower 271 comprises a foot 273 mounted on the end of a shaft 275 which is journalled in a linear bearing 277 on the detector carriage 261. The foot 273 is biased against the stator wedge 25 by a helical compression spring 279. In order to maintain a low mass, the foot 273 is preferably made of a material such as nylon. Since such materials are nonconductive, a copper foil strip 281 is provided on the upper surface of the foot. While the carriage is being positioned over a stator wedge, the foot 273 is raised to a retracted position while the carriage is being positioned over a stator wedge by a cable 283 reeved over pulleys 285 and wound on a windless pulley 287 driven by a motor 289. Up and down limit switches 291 and 293 respectively, control the motor 289 to position the foot 273 in the extended and retracted positions. A rod 295 projecting laterally from the upper end of the shaft 275 is connected to the carriage 261 by a spring 297 to maintain the foot aligned with the eddy current detector.

The eddy current detector 269 includes an eddy current coil 299 mounted in eddy current coil housing 301. The housing 301 is supported for vertical movement by a pair of linear bearings 303 which ride on shafts 305 supported by the carriage 261. A bracket 307 attached to the eddy current coil housing 301 supports a rack 309 which engages a pinion gear 311 driven by a motor 313. Operation of the motor 313 raises and lowers the eddy current coil. A limit switch 315 sets the upper limit of travel. The coil 299 is lowered until the precise distance from the foil 281 on the foot 273 is reached at a preset null position as previously described.

Figure 11:
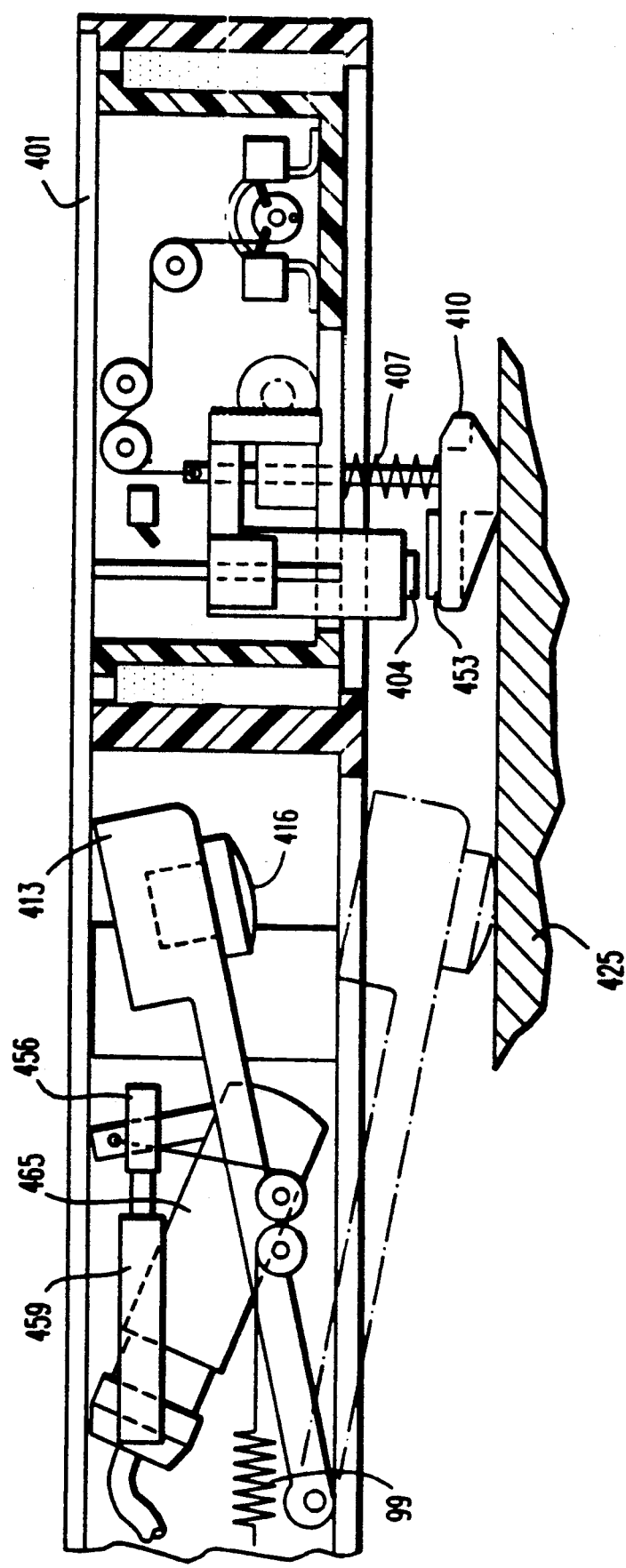
FIG. 11 is a side view of a modified low profile carriage of the present invention.
Figure 13:
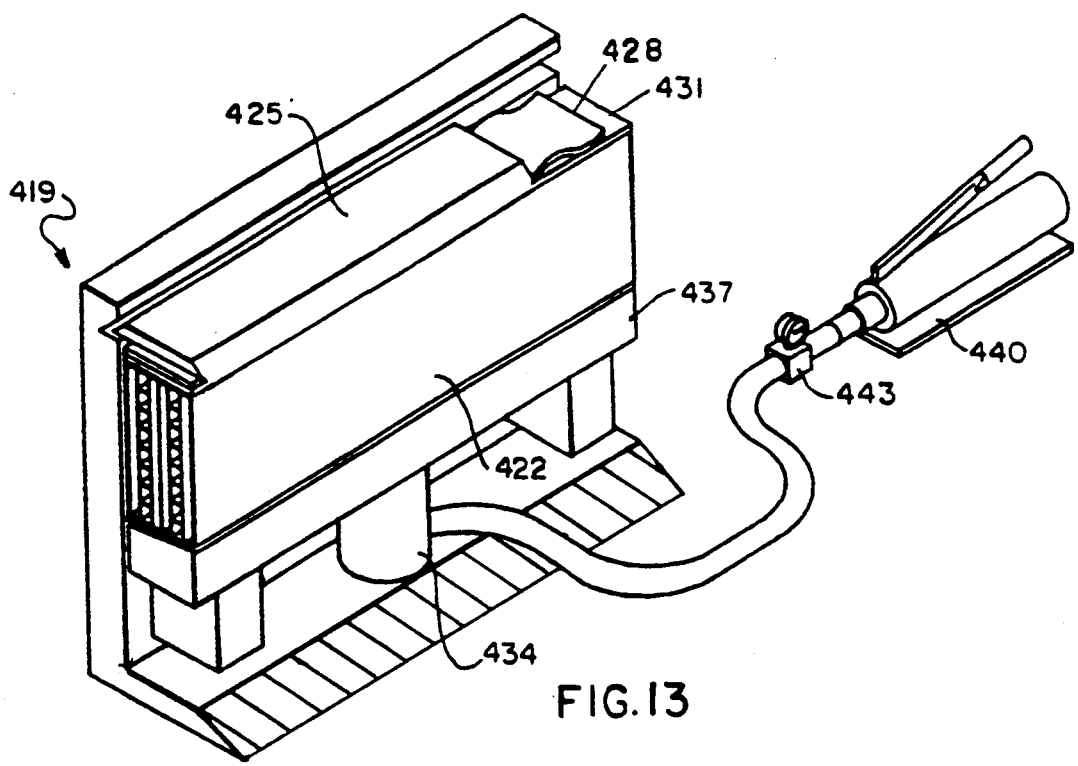
FIG. 13 is a side view of a calibration test stand.

Referring now to FIGS. 11 through 16, the improved apparatus and method of the present invention will be discussed in detail. In the preferred embodiment of the low profile carriage assembly of the present invention, FIG. 11 shows a side view of a carriage 401 doing impact testing with an eddy current sensor 404. A spring 407 has been added to suction cup device 410 to help the suction cup obtain the necessary vacuum seal on the stator wedge 425. In the previously discussed embodiments, the suction cup did not have a spring 407 attached to it (see FIG. 8). Through testing the applicants herein have discovered that without the spring 407 attached to the suction cup 410, it has difficulty sealing correctly on the stator wedge 425. Without the correct seal on the stator wedge 425 the suction cup 410 will not follow the stator wedge when it is impacted by the impact hammer 413. This can lead to erroneous data collected on the eddy current sensor 404 by the system computer.

To correlate wedge vibration data taken from the eddy current measurements of the above described system with the actual force exerted on a wedge by the generator coil assembly, the force applied to the wedge by the impact mechanism must be known. It is implied above that the impact force delivered by the hammer mechanism 413 is a constant value. In actual practice, it has been discovered by the applicants that the force applied by the hammer mechanism varies from wedge to wedge, although an approximate force can be varied and calculated based on the spring constants and the extension of the main springs (99). For coarse measurement of the force applied, a circumferential position feedback transducer is preferably added to the motor (117) that winds up the spring (99) that delivers energy to the impact hammer. It was also determined that this coarse force applied to the hammer must be varied as the carriage moves from slot to slot in the generator. This is due in part to the changing direction of the gravitational field as the carriage is indexed (and eventually becomes inverted). Although the force does not have to be the same for all slots, it must be within a calibration range as explained below.

Figure 12:
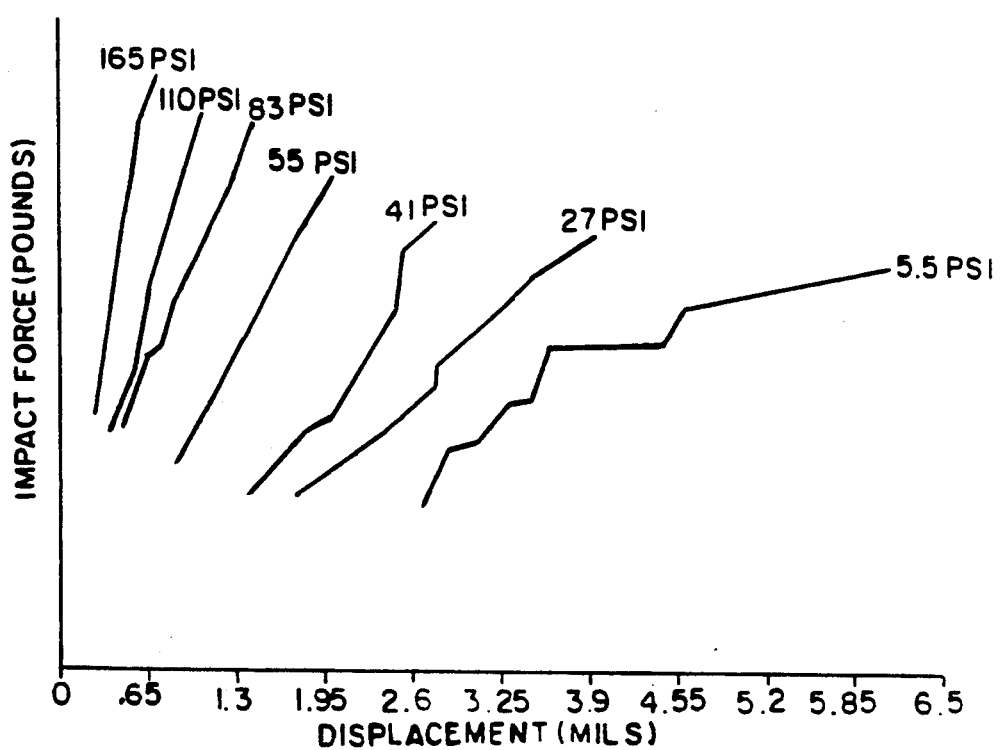
FIG. 12 is a graph showing a typical calibration curve set used in the measuring method of the present invention.
Figure 14:
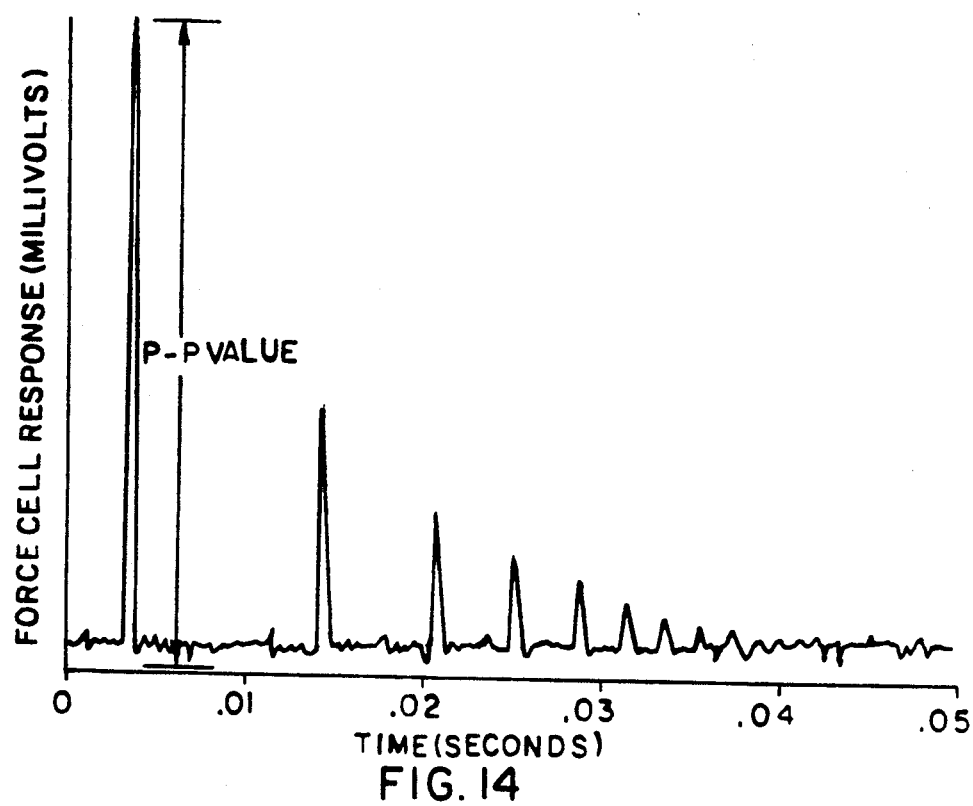
FIG. 14 is an output of the wedge tightness force cell generated by the present invention.

In order to determine the actual force applied by the hammer mechanism, a force cell 416 is attached to the hammer 413. The force cell provides an analog output proportional to the force applied by the hammer 413. A typical calibration curve set, shown in FIG. 12, is unique to a particular generator stator design, and is critical to the determination of an actual wedge tightness value (measured, for example, in pounds per square inch, psi). The curves are generated from impact testing of a stator coil/wedge calibration test fixture 419. The fixture, shown in FIG. 13, contains a short section of coils 422, wedges 425, and may contain springs 428 and/or shims 431 identical to the stator design to be tested (reference the stator cross-sectional view in FIG. 2). As mentioned previously, for those stator designs not including ripple springs, the calibration test stand would not include ripple springs. The fixture has the same slot width, stator tooth geometry, etc., as the stator design to be tested. The fixture is designed to allow a hydraulic load cell 434 to be placed under the stator coils 422 to apply a known force to the coil assembly through steel plate 437. Hydraulic pump 440 provides pressure to the load cell 434, as measured by test gauge 443 calibrated to NISI standards. For a given applied force from the load cell, the wedge 425 is impacted several times, each time varying the impact force of the hammer 413. For each impact, the measured force (FIG. 14) and wedge displacement (FIG. 15) are recorded. From this data, the force-displacement curve can be generated from the maximum peak-to-peak (p-p) data as shown in FIG. 12. The load cell 434 is varied to cover the range of expected wedge tightness psi values, and subsequent curves are generated as shown in FIG. 12.

The data from these curves is analyzed to perform a best fit curve to match the calibration data points. For each stator design, the data for impact forces below a certain level (approximately 360 pounds for the example in FIG. 12) is not graphed or used to produce the curve fit equations due to the random nature of the data below this level. A valid curve equation can be derived from the remaining data. As shown in FIG. 12, for a constant force applied, the relationship to the measured displacement as a function of varying wedge tightness (psi) is nonlinear, and the calibration curves themselves become progressively nonlinear for looser wedges. However, by using the curve equation at a given psi value, the actual wedge tightness can be linearly interpolated between two psi values given the experimental force and displacement data. The accuracy of this correlation can be increased by a sufficient number of calibration curves used for the interpolation. Equations for each best-fit curve for each of the selected calibration psi values are tabulated and stored as part of a computer program in the preferred embodiment, and used to analyze the eddy current and force data collected in actual field testing of a generator. The resulting curves do not necessarily intersect the origin (0,0) on the graph. This set of equations is unique to a particular stator design.

Figure 15:
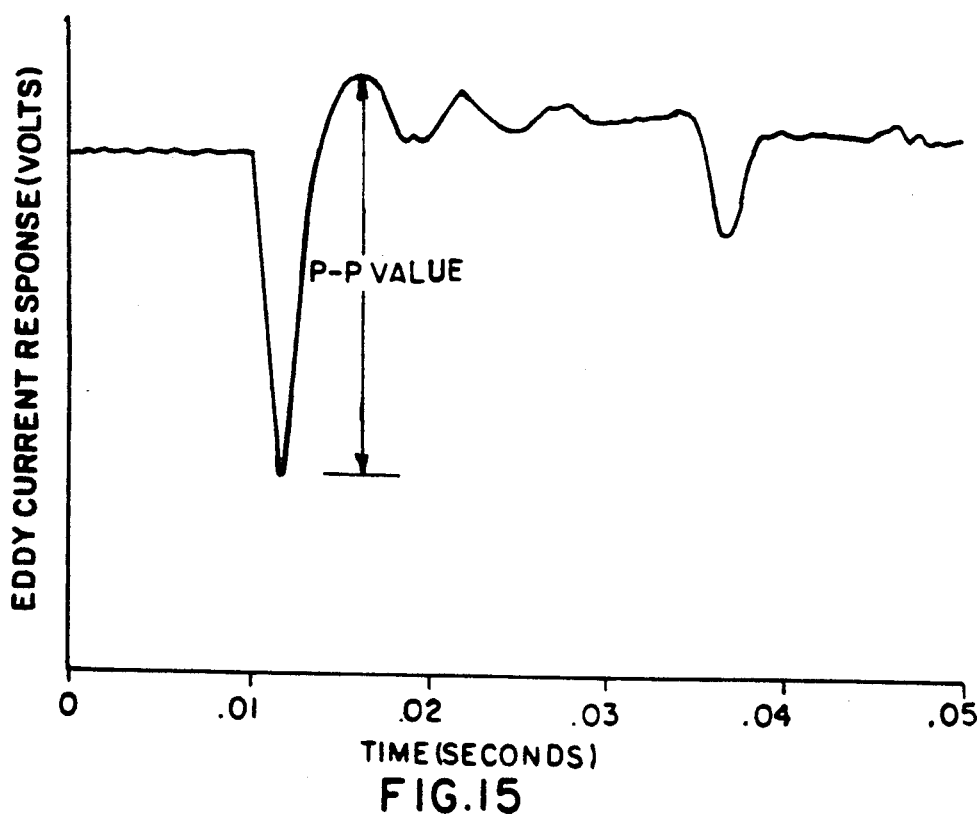
FIG. 15 is a displacement sensor output generated by the present invention.

During actual wedge tightness testing in the field, eddy current (FIG. 15) and force data (FIG. 14) are collected for each impact on a stator wedge 25. Often more than one impact is performed on a wedge to average the data. Following the data collection, the maximum p-p values are determined from the experimental force data (FIG. 14) and the eddy current displacement data (FIG. 15). Using the force p-p value as the independent variable, each psi calibration curve equation is solved for the dependent eddy current p-p value corresponding to each psi calibration curve. The actual eddy current p-p displacement value from the test will either fall between two of the calibration curves or will be out of range. If in range, a linear interpolation between the adjacent curve psi values is used to determine the psi value for the given force and eddy current p-p values. "Looseness" or "Tightness" of a wedge can then be determined from the original equipment manufacturer (OEM), based upon the OEM's force requirements for a particular stator design. The independent and dependent variables could easily be reversed and a similar solution derived with the same results.

Figure 16:
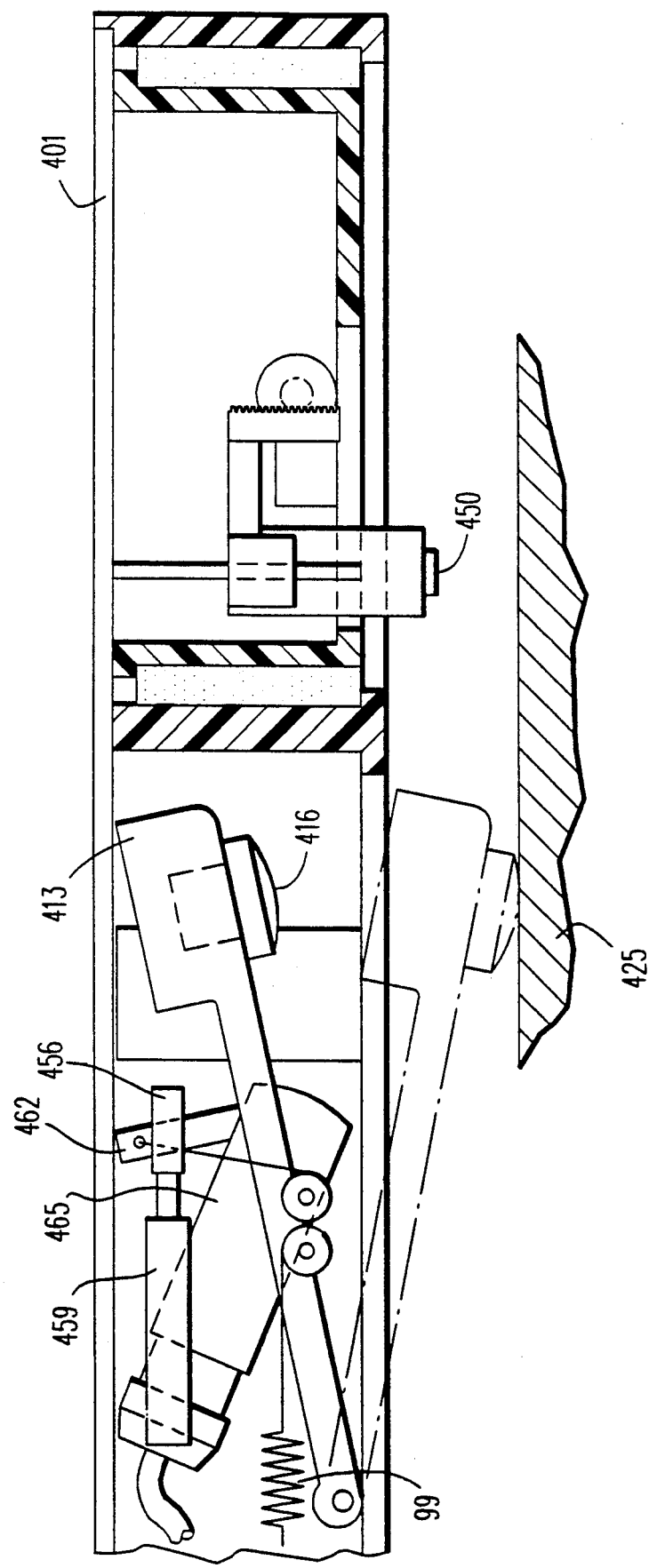
FIG. 16 is a further embodiment of a low profile carriage of the present invention.

FIG. 16 shows a further embodiment of the present invention using a capacitive sensor 450 instead of the eddy current sensor 404. The use of a capacitive sensor 450 to detect the vibration of the stator wedge has never been used before and has some advantages over using an eddy current sensor 404 shown in FIG. 1. The capacitive sensor 450 is set up to directly detect the actual distance from the sensor to the stator wedge 25, while the eddy current sensor 404 detects the distance from the sensor to the copper target on the suction cup 410. One advantage of the capacitive sensor 450 is that it measures the vibration or displacement of the stator wedge 25 directly which improves the accuracy of the measurement. Another advantage is that there are no coupling problems that occur due to the suction cup 410. These improvements provide the inspection with greater reliability and increased speed of testing.

An electric switch (not shown) is also preferably added to the latch release pin 456. When the latch motor 459 is retracting the latch pin, the moment that the latch release pin 456 breaks contact with the bracket 462 on the impact hammer 413, an electrical signal is sent to the computer control system. This feature tells the computer when to start collecting data from force cell 416 and the sensor (404,450). This "start collection" signal is necessary to collect critical portions of the force cell 416 and sensor signals. Camera 465 is provided to allow for visual monitoring by the operator.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of measuring the tightness of stator wedges in the stator of an electric generator without removing the rotor, the method comprising the steps of:
   i. providing a calibration test stand comprising a section of coils and wedges similar to that of the electric generator to be measured;
   ii. preloading said section of coils and wedges of the calibration test stand with a first predetermined force and generating a plurality of force-displacement curves obtained by impacting said wedges of the calibration test stand with a second predetermined force and measuring the displacement caused thereby;

iii. calculating a plurality of curve equations from said plurality of force-displacement curves;

iv. striking one of said stator wedges to cause a displacement thereof;

v. measuring the force used to strike the one stator wedge to generate force data;

vi. measuring displacement of the one stator wedge in response to being struck to generate displacement data;

vii. comparing said generated force and displacement data with said plurality of forcedisplacement curves to determine the tightness of the one wedge in said stator.

2. A method of measuring the tightness of stator wedges in the stator of an electric generator without removing the rotor, the method comprising the steps of:

i. providing a calibration test stand comprising a section of coils, filler material, and wedges substantially similar to that of the electric generator to be measured;

ii. preloading said section of coils, filler material, and wedges of the calibration test stand with a first range of predetermined forces measured at the load source and generating a plurality of force-displacement curves obtained by impacting said wedges of the calibration test stand with a second range of forces measured at an impact point and measuring the wedge displacement caused thereby;

iii. calculating a plurality of curve equations from said plurality of force-displacement curves;

iv. striking one of said stator wedges to cause a displacement thereof;

v. measuring the force used to strike the one stator wedge to generate force data;

vi. measuring displacement of the one stator wedge in response to being struck to generate displacement data;

vii. comparing said generated force and displacement data with said plurality of forcedisplacement curves to determine the tightness of the one wedge in said stator.

3. Apparatus for measuring the tightness of stator wedges in the stator of an electric generator without removing the rotor, said apparatus comprising:

a low profile carriage insertable in a narrow gap between the rotor and stator and successively positionable adjacent selected stator wedges;

an impactor carried by said low profile carriage, said impactor striking the selected stator wedge to cause a displacement thereof; and sensor means mounted on said low profile carriage for directly measuring the peak-to-peak amplitude displacement of the selected stator wedge in response to being struck by said impactor.

4. Apparatus as recited in claim 3, wherein said sensor means comprises a capacitive sensor mounted on said low profile carriage for measuring the maximum displacement of the stator wedge.

5. Apparatus as recited in claim 3, wherein said sensor means comprises a fiber optic sensor mounted on said low profile carriage for detecting light reflected from the selected stator wedge as said wedge is displaced in response to being struck by said impactor.

* * * * *